Sept. 21, 1965  R. I. ROBINSON ETAL  3,207,934
ELECTRIC MOTOR WITH IMPROVED COOLING MEANS
Filed April 18, 1962  2 Sheets-Sheet 1

INVENTORS
Russell I. Robinson,
Bruce T. Hein,
BY Joseph W. Purman,
Byron, Hume, Groen + Clement Sept. 21, 1965   R. I. ROBINSON ETAL   3,207,934
ELECTRIC MOTOR WITH IMPROVED COOLING MEANS
Filed April 18, 1962   2 Sheets-Sheet 2
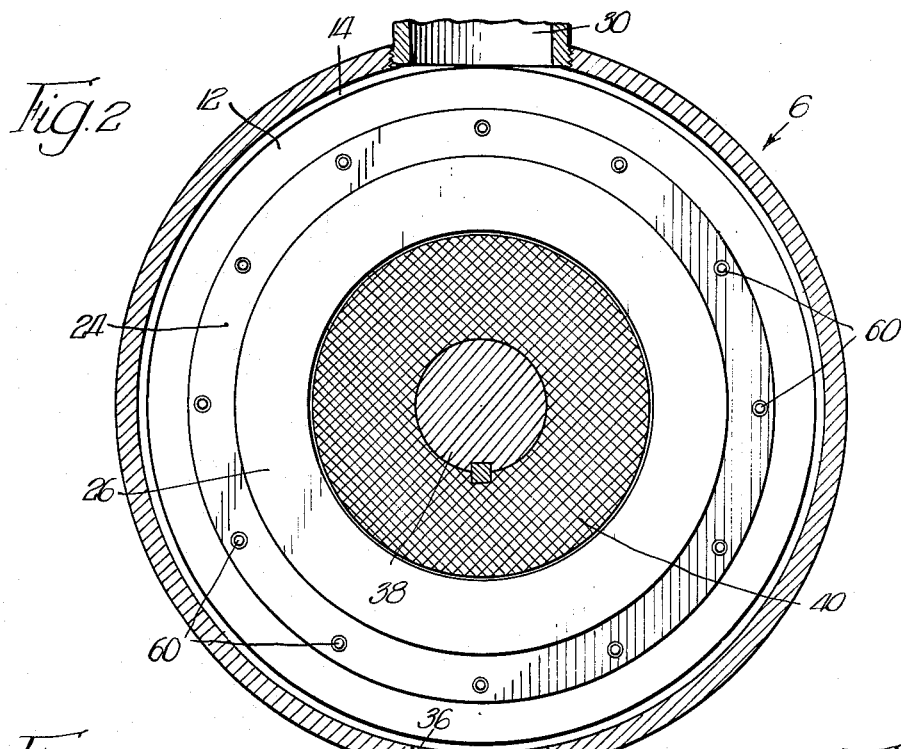
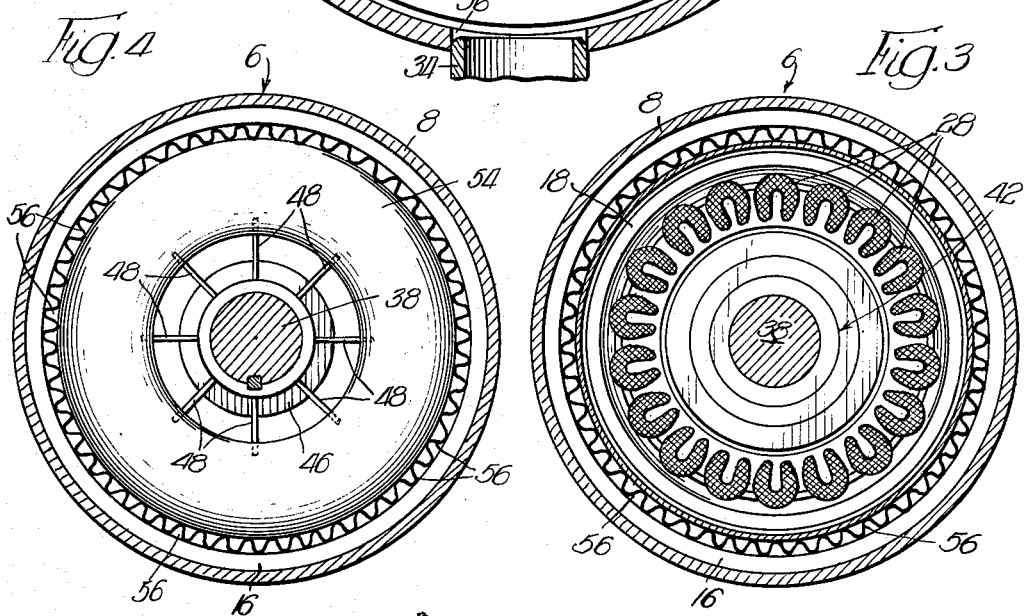
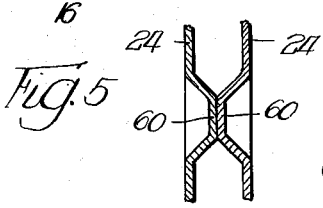
INVENTORS
Russell I Robinson,
Bruce T. Hein,
BY Joseph W. Purman, United States Patent Office 3,207,934
Patented Sept. 21, 1965

3,207,934
ELECTRIC MOTOR WITH IMPROVED
COOLING MEANS
Russell I. Robinson, Thiensville, and Bruce T. Hein and
Joseph W. Purman, Milwaukee, Wis., assignors to The
Louis Allis Company, Milwaukee, Wis., a corporation
of Wisconsin
Filed Apr. 18, 1962, Ser. No. 188,390
5 Claims. (Cl. 310—57)

The present invention relates to improvements in dynamoelectric machines, and more particularly to means to improve the cooling of totally enclosed large electric motors.

Many different schemes for cooling electric motors have been devised and tried in the past with varying degrees of success, but those heretofore proposed and available, for one reason or another, have not been too successful in large motors on the order of 600 H.P., especially where they are totally enclosed electric motors. Proper cooling of such motors is, of course, important as it permits the motor to have increased horsepower capacity.

Although some of the techniques employed to cool enclosed electric motors have been reasonably successful, they have suffered from the disadvantage of requiring extensive modifications of existing electric motors and have therefore prohibitively increased the cost of such electric motors.

It is therefore an object of this invention to provide a new and improved liquid cooled electric motor of a high horsepower rating.

It is a further object of the present invention to provide a liquid cooling system in high power rated motors which affords substantially even cooling throughout the heated portions of the motor.

It is a further object of the present invention to provide an electric motor with an improved liquid cooling system whereby both the periphery and ends of the stator core of the motor are cooled to achieve even heat transfer and thereby increase the horsepower capacity of the motor.

It is a further object of the present invention to provide an electric motor with a new and improved liquid cooling system, the cooling system being easily and inexpensively incorporated into a motor and affording increased horsepower capacity of the motor.

These and other objects are accomplished by the liquid cooled electric motor of the present invention wherein a cooling medium is circulated circumferentially around the stator core of the motor, the stator core having associated therewith heat conductors which extend radially outwardly from the center of the stator core to transmit heat therefrom to the circulating cooling medium. In addition the liquid cooled electric motor of the present invention has associated therewith an external gas circulating system whereby the cooling medium is also utilized to cool the circulating gas and the external ends of the motor, particularly the stator coils.

Although the present invention contemplates the cooling of motors irrespective of the machines they drive, providing that a source of cooling medium or refrigerant, such as fluorinated hydrocarbons, e.g., Freon, or water is available, the invention is particularly adapted to electric motors employed in liquid circulatory cooling systems. For instance, the invention is particularly adapted to electric motors which drive the compressor or compressors of refrigerating systems.

The invention, both as to its organization and method of operation, taken with further objects and advantages thereof, will best be understood by reference to the following description taken in connection with the accompanying drawings, in which:

FIGURE 2 is a cross-sectional view of the electric motor shown in FIGURE 1 taken along line 2—2 of FIGURE 1;

FIGURE 3 is a cross-sectional view of the electric motor shown in FIGURE 1 taken along line 3—3 of FIGURE 1;

FIGURE 4 is across-sectional view of the electric motor shown in FIGURE 1 taken along line 4—4 of FIGURE 1;

FIGURE 5 is an enlarged cross-sectional view of intercontacting dimples on the heat conductors of the motor shown in FIGURE 1; and, FIGURE 6 is a fragmentary, cross-sectional elevational view of a modified electric motor embodying the features of the present invention.

Figure 1:
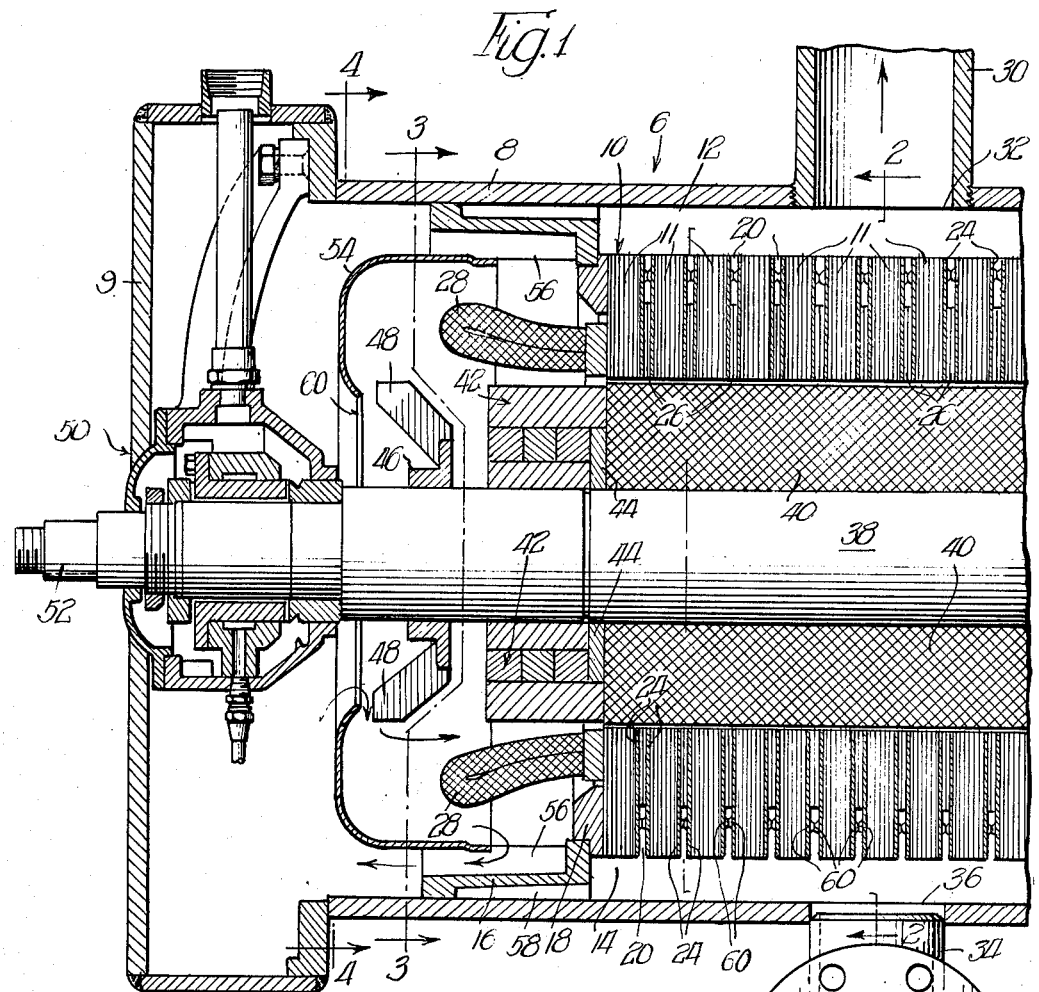
FIGURE 1 is a longitudinal, elevational, cross-sectional view of an electric motor embodying the features of the present invention.

Referring now to the drawings, and more particularly to FIGURES 1-5, the new and improved liquid cooled electric motor of the present invention is illustrated generally by reference numeral 6. In accordance with the present invention suitable cooling medium, for example a liquid hydrocarbon, such as Freon, or water, is circulated circumferentially around the periphery of the stator core of the motor 6 to remove heat therefrom being developed during its operation. Furthermore, the stator core has associated therewith heat conductors whereby heat is conducted from the interior of the motor 6 to the circulating cooling medium at the periphery of the stator core to assist in removing heat from the motor 6. In addition, the cooling medium is employed to cool gas circulated at the ends of the motor 6, whereby additional cooling of the motor 6 is effected.

To these ends, the motor 6 is totally enclosed by a cylindrical housing or casing 8 having end walls 9, only one of which is shown in the drawings. The motor 6 has a customary laminated stator core 10 mounted within and spaced from the housing 8 to form an annular chamber 12 surrounding the periphery of the stator core 10. The stator core 10 is supported at its ends by annular clamping rings 16 which cooperate with a locking ring 18 to prevent vertical and horizontal movement of the stator core laminations. Though only one end of the motor 6 has been illustrated in FIGURE 1, it will be understood that the other end of the stator core 10 is supported in the same manner.

The laminations of the stator core 10 are divided into a plurality of axially spaced groups 11, the spaces therebetween providing annular passages 20 which communicate with the annular chamber 12 formed between the housing 8 and the stator core 10. Each group 11 of laminations has on its end a heat conductor 24, made of copper, aluminum or the like. The heat conductor 24 is an annular-shaped, radially extending plate having an inner periphery which extends into the innermost portion of the stator core 10 and an outer periphery which extends to the outer periphery of the group 11 of laminations. Annular spacers 26, also laminated core members, but of lesser diameter than the groups 11, are positioned between the groups 11 of laminations to maintain a predetermined space between adjacent groups 11 of stator laminations. Field coils 28 extend back and forth through the laminations of the stator core 10, the heat conductors 24 and the spacers 26. The loops of the field coils 28 are exposed at the ends of the motor as shown in FIGURES 1 and 3.

The heat conductors 24 transfer the heat from the interior of the electric motor 6 to the outer periphery of the stator core 10 whereby heat exchange may be effected with the cooling medium in the chamber 12 and the annular passages 20. In this connection the casing 8 has an opening 36 which engages an inlet pipe 34 through which suitable cooling medium is passed to partially, about 75 to 90 percent, fill the chamber 12. As the motor 6 operates, heat passes through the heat conductors 24 outwardly to the cooling medium in the chamber 12 and the annular passages 20. As the cooling medium accepts heat it will vaporize, the vaporized cooling medium leaving the chamber 12 through an outlet pipe 30 which is attached to the housing 8 at an opening 32. Additional liquid cooling medium is added as necessary to supplement the cooling medium that is lost through vaporization.

The motor 6 has a shaft 38 with rotor laminations 40 being mounted thereon. The rotor laminations 40 are clamped in place between locking rings, indicated generally by reference numeral 42, which are seated in grooves in the shaft 38 and bear against an end clamping collar 44 on each end of the shaft 38. This construction is normally employed in conventional electric motors and forms no part of the present invention.

Secured to the shaft 38 of the motor 6 is a hub 46 having a plurality of radially extending fan blades 48 which rotate with the rotational movement of the shaft 38. The shaft 38 is supported at its ends by bearings, indicated generally by reference numeral 50 (only one of which is shown in the FIGURE 1). The free end 52 of the shaft 38 extends through a sealed opening in the end wall 9 and is connected to a compressor or the like which the motor 6 is to drive.

An annular deflector 54 having an opening 60 is mounted within the housing 8 on the annular shaped clamping ring 16. The deflector 54 is mounted upon a plurality of longitudinally extending, radial ribs 56 on the clamping member 16 by suitable means not shown in the drawings. Cooling medium will flow from the chamber 12 into an annular chamber 58 formed between the clamping ring 16 with the housing 8. In this manner, the clamping ring 16 and its ribs 56 provide a large cooling surface for air which passes over the ring 16 as a result of the convection currents created by the rotation of the blades 48.

When the motor 6 is operating the blades 48 rotate causing gas in the enclosed housing 8 to pass over the loops of the field coils 28 and the end of the motor 6, between the deflector 54 and the clamping ring 16 and around the deflector 54 through its opening 60 back to the blades 48. The flow path of the gas is illustrated by the arrows in FIGURE 1. In this manner the air cools the end of the motor 6 and the loops of the field coils 28. In so doing the air becomes heated. As the heated air passes between the deflector 54 and the clamping ring 16, however, it comes into intimate contact with the plurality of ribs 56 on the ring 16, which have been cooled by the cooling medium in the chambers 12 and 58. As the gas contacts the ribs 56 and the ring 16 it is cooled such that it will again remove heat from the end of the motor 6 and the field coils 28 as it is recycled. Thus the blades 48, the deflector 54 and the ring 16 cooperate to form a gas circulating system to cool the end of the motor 6.

As seen in FIGURES 1, 2 and 5 the heat conductors 24 are provided with aligned dimples or projections 60 which extend outwardly from the side of the particular group 11 of laminates with which the heat conductor 24 is associated. The dimples 60 of adjacent heat transfer members 24 are aligned with and in contact with one another so that the adjacent heat conductors 24 cooperate with one another to assist in passing the heat from the interior of the motor 6 to the outer periphery of the stator core 10. In this manner, should one heat conductor 24 be withdrawing more heat than its associated heat conductor 24, the latter will have heat transferred thereto and assist in removing the heat from the "hot spots" in the motor 6.

It will be understood that the use of the dimples 60 is merely a preferred form of the present invention.

Figure 6:
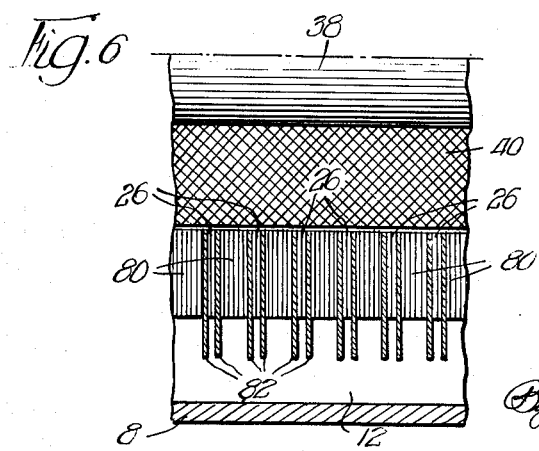

Referring now to FIGURE 6 there is illustrated a modified motor embodying the features of the present invention. It will be understood that those parts of the motor shown in FIGURE 6 which art identical to that of motor 6 have been indicated with the same reference numerals. In the embodiment shown in FIGURE 6 the groups 80 of stator core laminations do not extend outwardly as far as heat conductors 82. The heat conductors 82 are the same as the heat conductors 24 discussed hereinbefore, except that they do not have the dimples or projections 60 thereon, though they could if desired. This modified structure increases the volume of the chamber 12 to allow more coolant to withdraw heat from the motor. Furthermore, this modification exposes a greater area of the heat conductor 82 whereby heat is more readily withdrawn therefrom. It will be understood that in all other respects the motor of the modification shown in FIGURE 6 is identical to the motor 6 illustrated in FIGURES 1-5.

While the embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An electric motor having:
   a housing;
   a rotor including a shaft mounted within said housing;
   a stator surrounding the rotor and having end coils;
   a pair of rings mounting said stator in said housing having heat exchanger means mounted thereon, said stator, housing, and rings defining an enclosed fluid-tight annular chamber;
   an inlet and an outlet for conducting cooling fluid into and out of said chamber, thereby to cool said stator and said rings;
      said end coils extending from the stator and located on the outside of said chamber but within said housing,
   means within said housing for producing circulating air currents over and to cool said end coils and also over said cooled rings whereby the latter acts to cool said air.

2. The electric motor set forth in claim 1 including an annular deflector adjacent said end coils and said rings, said means for producing air currents acting to pass air past said deflector for consequent passage of air over the end coils and over the heat exchanger means on said rings.

3. The electric motor described in claim 1 further characterized in that said heat exchanger means comprising a plurality of cooling ribs on said rings.

4. The electric motor described in claim 2 further characterized in that said annular deflector is mounted on heat exchanging ribs on said rings.

5. An electric motor having:
   a housing;
   a rotor including a shaft mounted within said housing;
   a stator surrounding the rotor and having end coils, said stator being made up of a plurality of groups of stacked laminations and including a plurality of annular grooves in the outer periphery;
   a pair of rings having heat exchanger means mounted thereon mounting said stator in said housing, said grooved outer periphery of said stator, said housing, and said rings, defining an enclosed fluid-tight annular chamber;
   an inlet and an outlet for conducting cooling fluid into and out of said chamber, thereby to cool said stator by cooling fluid traversing said grooves and to cool the heat exchanger means on said rings;
      said end coils extending from the stator and located on the outside of said chamber but within said housing, means within said housing for producing circulating air currents over and to cool said end coils and also over said heat exchanger means on said rings whereby the latter acts to cool said air.

References Cited by the Examiner

UNITED STATES PATENTS

| | | | |
|---|---|---|---|
| 831,625 | 9/06 | McElroy | 310—65 |
| 876,568 | 1/08 | Lord | 310—64 X |
| 1,794,029 | 2/31 | Pfleger | 310—57 |
| 2,536,815 | 1/51 | Koch | 310—57 |

FOREIGN PATENTS

| | | |
|---|---|---|
| 48,361 | 4/12 | Austria. |
| 162,552 | 5/21 | Great Britain. |
| 218,683 | 11/24 | Great Britain. |

MILTON O. HIRSHFIELD, *Primary Examiner.*

DAVID X. SLINEY, *Examiner.*